(12) United States Patent
Addiego et al.

(10) Patent No.: US 8,801,834 B2
(45) Date of Patent: Aug. 12, 2014

(54) ARTICLE FOR CARBON DIOXIDE CAPTURE

(75) Inventors: William Peter Addiego, Big Flats, NY (US); Michael John Bennett, Corning, NY (US)

(73) Assignee: Corning Incorporated, Corning, NY (US)

( * ) Notice: Subject to any disclaimer, the term of this patent is extended or adjusted under 35 U.S.C. 154(b) by 45 days.

(21) Appl. No.: 13/397,127

(22) Filed: Feb. 15, 2012

(65) Prior Publication Data

US 2012/0216676 A1   Aug. 30, 2012

Related U.S. Application Data

(60) Provisional application No. 61/447,329, filed on Feb. 28, 2011.

(51) Int. Cl.
| | | |
|---|---|---|
| *B01D 53/02* | (2006.01) | |
| *B01J 20/08* | (2006.01) | |
| *B01J 20/28* | (2006.01) | |

(52) U.S. Cl.
CPC ........ *B01D 53/02* (2013.01); *B01D 2253/3425* (2013.01); *B01J 20/08* (2013.01); *B01D 2257/504* (2013.01); *Y02C 10/08* (2013.01); *B01D 2253/104* (2013.01); *B01D 2253/202* (2013.01); *B01J 20/28045* (2013.01); *B01D 2253/306* (2013.01); *B01D 2253/25* (2013.01); *B01D 2253/311* (2013.01)
USPC ................................ 95/139; 96/108; 502/400

(58) Field of Classification Search
USPC .............................. 95/139; 96/108
See application file for complete search history.

(56) References Cited

U.S. PATENT DOCUMENTS

| 4,493,715 | A  * | 1/1985 | Hogan et al. ..................... 95/139 |
| 6,500,236 | B2 * | 12/2002 | Suzuki et al. ................... 95/113 |
| 6,530,975 | B2 * | 3/2003 | Rode et al. ...................... 95/117 |
| 6,797,227 | B2 | 9/2004 | Addiego |
| 8,182,775 | B2 * | 5/2012 | England ......................... 423/210 |
| 2008/0127822 | A1 * | 6/2008 | England ........................... 95/132 |
| 2008/0293976 | A1 * | 11/2008 | Olah et al. .................... 568/698 |
| 2009/0110873 | A1 | 4/2009 | Jiang et al. |
| 2010/0129547 | A1 | 5/2010 | Jiang et al. |
| 2010/0212495 | A1 | 8/2010 | Gadkaree et al. |
| 2010/0300289 | A1 * | 12/2010 | Jiang ............................... 95/136 |

FOREIGN PATENT DOCUMENTS

| EP | 1721653 | 11/2006 |
| JP | 61227822 | 9/1986 |
| WO | 2010099387 A1 | 9/2010 |

OTHER PUBLICATIONS

M. G. Plaza et al., Application of Thermogravimetric Analysis to the Evaluation of Aminated Solid Sorbents for CO2 Capture, .Journal of Thermal Anal.and Calorimetry, vol. 92 (2008) 2. 60!-606.
Abstract of Patent JP61227822, Sep. 10, 1986.

* cited by examiner

*Primary Examiner* — Christopher P Jones
(74) *Attorney, Agent, or Firm* — Susan S. Wilks; Michael A. Hood

(57) ABSTRACT

An article having a flow-through substrate having open channels defined by porous walls, wherein the flow-through substrate includes alumina; and a $CO_2$ sorbent disposed on the flow-through substrate, wherein the $CO_2$ sorbent impregnates the porous walls of the flow-through substrate. Methods of making the article, its use for $CO_2$ capture, and methods for regenerating the article for further use are also disclosed.

13 Claims, 1 Drawing Sheet

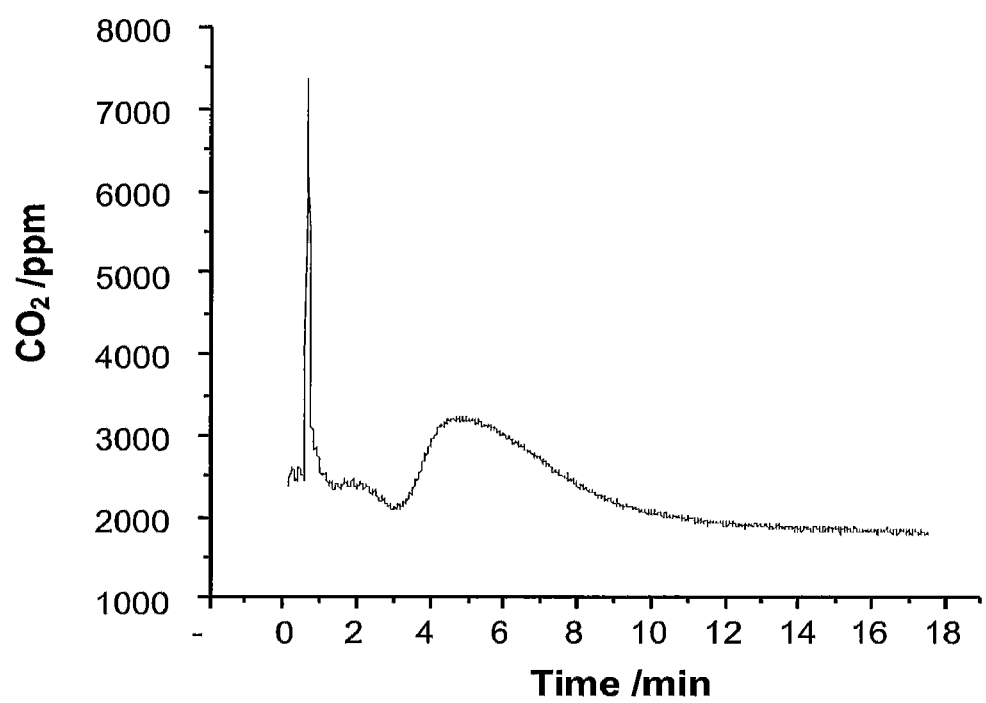

ARTICLE FOR CARBON DIOXIDE CAPTURE

CROSS-REFERENCE TO RELATED APPLICATIONS

This application claims the benefit of priority under 35 U.S.C. §119 of U.S. Provisional Application Ser. No. 61/447,329, filed on Feb. 28, 2011, the content of which is relied upon and incorporated herein by reference in its entirety.

FIELD OF THE DISCLOSURE

The present disclosure relates generally to articles used in the removal of $CO_2$ from a gas, and in particular articles comprising a flow-through substrate comprised of activated alumina, and a $CO_2$ sorbent.

SUMMARY

Disclosed herein is an article for removing $CO_2$ from a gas, the article comprising a flow-through substrate comprising open channels defined by porous walls, wherein the flow-through substrate comprises activated alumina, and a $CO_2$ sorbent disposed on the flow-through substrate, wherein the $CO_2$ sorbent impregnates the porous walls of the flow-through substrate.

Also disclosed is a method of making the article, the method comprising preparing a solution of $CO_2$ sorbent dispersed in a solvent and contacting a flow-through substrate comprising channels defined by porous walls with the solution.

Additional embodiments include a method of removing $CO_2$ from a gas, the method comprising providing the article and contacting the article with a gas comprising $CO_2$. Also disclosed is a method of desorbing $CO_2$ from the article comprising heating the article to a temperature above the desorption temperature of the $CO_2$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a desorption curve of $CO_2$ according to an embodiment disclosed herein.

DETAILED DESCRIPTION

Disclosed herein is an article for removing $CO_2$ from a gas, the article comprising a flow-through substrate comprising open channels defined by porous walls, wherein the flow-through substrate comprises activated alumina, and a $CO_2$ sorbent disposed on the flow-through substrate wherein the $CO_2$ sorbent impregnates the porous walls of the flow-through substrate. The article disclosed is capable of sorbing $CO_2$, and desorbing at least a portion of the sorbed $CO_2$ at an increased temperature.

In some embodiments, the flow-through substrate comprises gamma alumina, or activated alumina, or combinations thereof. The term "activated" alumina includes transition phases of alumina, not including alpha alumina.

In an aspect (1), the disclosure provides an article for removing $CO_2$ from a gas, the article comprising: a flow-through substrate comprising open channels defined by porous walls; wherein the flow-through substrate comprises activated alumina; and a $CO_2$ sorbent disposed on the flow-through substrate; wherein the $CO_2$ sorbent impregnates the porous walls of the flow-through substrate. In an aspect (2), the disclosure provides the article of aspect 1, wherein the article is capable of sorbing $CO_2$ at a first temperature and desorbing at least a portion of the sorbed $CO_2$ at a second temperature. In an aspect (3), the disclosure provides the article of aspect 1, wherein the porous walls of the flow-through substrate have a porosity of at least 50%. In an aspect (4), the disclosure provides the article of aspect 1 or 2, wherein the porous walls of the flow-through substrate have a surface area greater than 200 $m^2/g$. In an aspect (5) the disclosure provides the article of any one of aspects 1-4, wherein the flow-through substrate is honeycomb shaped. In an aspect (6), the disclosure provides the article of any one of aspects 1-5, wherein the flow-through substrate comprises activated alumina. In an aspect (7), the disclosure provides the article of any one of aspects 1-5, wherein the flow-through substrate comprises gamma alumina. In an aspect (8), the disclosure provides the article of any one of aspects 1-7, $CO_2$ sorbent comprises a polyethyleneimine. In an aspect (9), the disclosure provides a method of making the article of any one of aspects 1-8, wherein the method comprising: preparing a solution of $CO_2$ sorbent dispersed in a solvent; contacting a flow-through substrate comprising channels defined by porous walls with the solution. In an aspect (10), the disclosure provides a method of removing $CO_2$ from a gas, the method comprising: providing an article of any one of aspects 1-8; contacting the article with a gas comprising $CO_2$. In an aspect (11), the disclosure provides the method of aspect 10, wherein the contacting occurs at a temperature of up to 40° C. In an aspect (12), the disclosure provides a method of desorbing $CO_2$ from an article of any one of aspects 1-8, comprising heating the article to a temperature above the desorption temperature of the $CO_2$.

In some embodiments, the porous walls of the flow-through substrate have a porosity of at least 70%, at least 65% at least 60%, at least 55%, at least 50%, at least 45%, at least 40%, or at least 35%. In some embodiments, the porous walls of the flow-through substrate have a surface area of 100 $m^2/g$ or more, 150 $m^2/g$ or more, 200 $m^2/g$ or more, or 250 $m^2/g$ or more. A high surface area flow-through substrate reduces the need for an intermediate alumina coating useful, for example, when a low surface area flow-through substrate is employed.

In some embodiments, the flow-through substrate has a honeycomb structure comprising an inlet end, an outlet end, and inner channels extending from the inlet end to the outlet end. In some embodiments, the honeycomb comprises a multiplicity of cells extending from the inlet end to the outlet end, the cells being defined by intersecting cell walls.

The flow-through substrate may be made using suitable techniques, for example, the flow-through substrate may be made by extrusion. Example methods of making an alumina honeycomb are disclosed in U.S. Pat. No. 6,797,227, the contents of which are incorporated by reference herein.

In some embodiments, a $CO_2$ sorbent is disposed on the flow-through substrate. The $CO_2$ sorbent is selected based on its capacity to adsorb $CO_2$ from air or other sources due to high concentration of amine groups that readily and reversibly react with $CO_2$ to form carbonate and carbamate species. The $CO_2$ sorbent may comprise primary and/or secondary amines. In some embodiments, the $CO_2$ sorbent comprises an amine bearing metallo-organics, such as aminopropyl triethoxy silane. In some embodiments, the $CO_2$ sorbent comprises an organic amine. In some embodiments, the $CO_2$ sorbent comprises a polyethyleneimine (PEI). In some embodiments, the $CO_2$ sorbent does not degrade below 150° C.

The $CO_2$ sorbent is disposed on the flow-through substrate. In some embodiments, the $CO_2$ sorbent is disposed as a layer. The term "layer" as used herein means that the $CO_2$ sorbent is disposed on exposed surfaces of the flow-through substrate. The $CO_2$ sorbent may coat all or a portion of the surfaces of the flow-through substrate, and may impregnate the porous walls of the flow-through substrate. For instance, the layer may coat the inner channel surfaces of a flow-through substrate and any outer surfaces of the flow-through substrate. In some embodiments, the $CO_2$ sorbent is in the form of an uninterrupted and continuous layer over all or a portion of the surfaces of the flow-through substrate. In other embodiments, the layer of $CO_2$ sorbent comprises cracks, pinholes, or any other discontinuities. In some embodiments, portions of the exposed surfaces of the flow-through substrate remain uncoated. In some embodiments, the $CO_2$ sorbent does not significantly change or reduce the surface porosity of the flow-through substrate walls.

In some embodiments, at least a portion of the $CO_2$ sorbent is chemically bound to at least a portion of flow-through substrate. Thus, in these embodiments, some or all of the $CO_2$ sorbent can be chemically bound to some or all of the flow-through substrate.

In some embodiments, at least a portion of the $CO_2$ sorbent is mechanically bound to at least a portion of flow-through substrate. Thus, in these embodiments, some or all of the $CO_2$ sorbent can be mechanically bound to some or all of the flow-through substrate.

In some embodiments, the $CO_2$ sorbent is capable of dispersion in a solvent. Example solvents include polar organic solvents, for example alcohols. In one embodiment, the solvent is methanol. In some embodiments, the ratio of $CO_2$ sorbent to solvent is in the range of from 1:1 to 1:3, from 1:1 to 1:5, from 1:4 to 1:10, from 1:5 to 1:15, from 1:10 to 1:15.

In some embodiments, a solution of $CO_2$ sorbent, for example, amine polymers, is prepared such that the resulting viscosity is sufficiently low to permit penetration and wetting of the flow-through substrate porous walls. In some embodiments, the amine polymers may be dried at >40° C. without cross-linking, or in other embodiments, the amine polymers may be cross-linked and then dried. In embodiments where amine monomers are used, interfacial polymerization precedes drying.

The $CO_2$ sorbent may be disposed on the flow-through substrate using a suitable technique such as by applying a solution of the $CO_2$ sorbent to the flow-through substrate. As examples, the $CO_2$ sorbent can be applied by dipping the flow-through substrate in a solution comprising the $CO_2$ sorbent, by pouring the solution comprising the $CO_2$ sorbent on the flow-through substrate, or by spraying a solution comprising the $CO_2$ sorbent on the flow-through substrate.

The eventual quantity of $CO_2$ sorbent formed on the flow-through substrate is dependent on the amount of $CO_2$ sorbent that is retained by the flow-through substrate. The amount of $CO_2$ sorbent retained by the flow-through substrate can be increased e.g., by contacting the flow-through substrate with the $CO_2$ sorbent more than once and allowing the flow-through substrate to dry between contacting steps. In addition, the amount of $CO_2$ sorbent retained by the substrate can be controlled by modifying, alone or in combination, parameters including pore volume, pore size distribution, flow-through substrate geometry, and surface area. For example, increasing porosity will increase the amount of $CO_2$ sorbent retained by the flow-through substrate. In some embodiments, a single contacting step is necessary to achieve an appropriate amount of $CO_2$ sorbent quantity.

In some embodiments, the amount of $CO_2$ sorbent disposed on the flow-through substrate results in up to a 30 weight percent, up to 35 weight percent, up to 40 weight percent, up to 45 weight percent, or up to 50 weight percent increase over the flow-through substrate.

An article as disclosed, including any of the embodiments described herein, may be used, for example, for the sorption of $CO_2$ from a gas through contact with the gas. For example, a gas stream may be passed through open channels of a flow-through substrate, having a $CO_2$ sorbent disposed thereon, from the inlet end to the outlet end.

The terms "sorb," "sorption," and "sorbed," refer to the adsorption, sorption, or other entrapment of the $CO_2$ on the article, either physically, chemically, or both physically and chemically.

In some embodiments, the $CO_2$ sorption occurs at a temperature up to 30° C., 40° C., 50° C., 60° C., or 70° C.

Also disclosed is a method of desorbing at least a portion of sorbed $CO_2$ from the article, wherein the method comprises providing the article having $CO_2$ sorbed thereon, and heating it to a temperature above the desorption temperature of the $CO_2$. Desorbing of the sorbed $CO_2$ may also be referred to as regeneration of the article. The article can be heated using a suitable method. For example, in one embodiment, the article can be heated by a flow of hot inert gas such as nitrogen.

It should be appreciated that a sufficient temperature to desorb the $CO_2$ will depend, in part, on the amount of $CO_2$ that is present. In one embodiment, a sufficient temperature can comprise heating the article at a temperature in the range of from 50° C. to 300° C., including, for example, temperatures of 100° C., 150° C., 180° C., or 200° C. In another embodiment, the sufficient heating temperature can be in a range derived from these values, including for example, a range from 90° C. to 200° C., or 90° C. to 180° C.

It is desirable to desorb $CO_2$ at low temperatures to achieve greater efficiency. A high surface area alumina, as disclosed herein, uses less energy for $CO_2$ desorption than other flow-through substrates, such as cordierite flow-through substrates. The lower thermal mass of an alumina flow-through substrate, versus for example, a cordierite flow-through substrate allows desorption of $CO_2$ at a lower temperature and therefore a greater efficiency than when a cordierite flow-through substrate is employed.

Various embodiments will be further clarified by the following example.

Example 1

The alumina honeycombs tested were made from a gamma alumina powder obtained from Sasol known as SBa 200. The alumina powder is ball milled or otherwise comminuted to a particle size distribution with desired size ranges. In this particular case, bi-modal distribution with a d50 of ~5-30 microns, and preferably to 10-20 microns and then sieved to −170 mesh. The smallest particles in the resulting distribution were ~0.05 to 0.1 microns with the largest being slightly above 100 microns. The surface BET, pore volume distribution (PVD) and mercury intrusion porosimetry (MIP) data of the alumina powder and calcined honeycombs are shown in Table 1. After extrusion and calcination, the alumina retains surface area and high porosity. Porosity is increased with the addition of rice starch pore former.

TABLE 1

|  |  | BET Surface Area m$^2$/g | Pore Volume cc/g | % porosity | Median Pore size A |
|---|---|---|---|---|---|
| Powder | As is | 212 | 0.47 | n/a | 62 |
|  | Ball milled | 209 | 0.42 | n/a | 61 |
| Honeycomb without pore former | As is | 202 | 0.63 | 66 | 88 |
|  | Ball milled | 203 | 0.34 | 51 | 65 |
| Honeycomb with 10% rice starch pore former | Ball milled | 208 | 0.39 | 55 | 67 |

The ball-milled powder was extruded in-house on a ram extruder with a honeycomb die 1 inch diameter and with a cell geometry of 200/12. The extrudates were treated at 80° C. in a hydrating environment. The hydrating environment was achieved by wrapping the freshly extruded ware in aluminum foil and crimping the ends of the foil to trap the escaping moisture inside the foil. After 2 to 3 days, the foil was ventilated and the extrudates were allowed to finish drying at 80° C. The now-dried alumina honeycombs were then calcined at 550 C for 3 hours. After calcination the alumina honeycombs were cut into pieces ~1 inch long in preparation for impregnation with PEI. BET/PVD data of the calcined honeycombs showed them to have a surface area of 203-208 m$^2$/g and about 51-55% porosity. Honeycombs that were made with alumina powder as-is from the manufacturer extruded poorly due to the coarse particle size distribution.

The alumina honeycombs were impregnated with a solution of 600 M.W. polyethyleneimine (PEI) and methanol. The honeycombs were dried ahead of time at 70 to 80 C overnight to remove moisture. The mixture consists of a 1:1 mass ratio of methanol and 600 mw PEI. The solution was prepared in a beaker and stirred on a warm hot plate for about 15 to 20 minutes. After the solution was thoroughly mixed the alumina sample was placed in a clean, dry 30 ml beaker with the channels of the honeycomb running vertically. The PEI/methanol solution was poured over the alumina honeycomb. The excess liquid was shaken out of the sample; when necessary, channels were cleared of solution with compressed air. The sample was placed in a dryer at 70 C. After 20-30 minutes, the coating appeared dry. The process was repeated to achieve the desired pickup of PEI, typically a 30-50 wt % increase over the bare uncoated mass of the monolith. Usually the process was only repeated once to achieve a pickup of 35-45%.

In a test setup, four PEI-coated alumina monoliths were assembled, in tandem, in a quartz tub reactor. The total amount of PEI coated on the monoliths in the reactor was 9.6 g. The sample was degassed at 100 C in nitrogen and cooled to room temperature. The samples were exposed to a mixture of 3% $CO_2$ and 5% $H_2O$ in nitrogen. The gas mixture flowed through the monoliths in the reactor at 500 cc/min at 30 C until the samples were saturated with $CO_2$, as determined by 100% $CO_2$ breakthrough point measured by FTIR. After flushing the reactor with flowing nitrogen, the temperature was ramped to 110 C while $CO_2$ desorption was monitored by FTIR, as shown below. FIG. 1 shows desorption of $CO_2$ from the PEI-coated alumina monolith. From integration of the desorption curve, it is estimated that 1.4 mmol $CO_2$/g-PEI were adsorbed at room temperature and desorbed as the samples were heated to 110° C.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An article for removing $CO_2$ from a gas, the article comprising:
   a flow-through substrate comprising open channels defined by porous walls;
   wherein the flow-through substrate comprises activated alumina; and a $CO_2$ sorbent disposed on the flow-through substrate;
   wherein the $CO_2$ sorbent impregnates the porous walls of the flow-through substrate;
   wherein the porous walls of the flow-through substrate have a porosity of at least 50%; and
   wherein the flow-through substrate comprises gamma alumina.

2. The article of claim 1, wherein the article is capable of sorbing $CO_2$ at a first temperature and desorbing at least a portion of the sorbed $CO_2$ at a second temperature.

3. The article of claim 2, wherein the porous walls of the flow-through substrate have a surface area greater than 200 m2/g.

4. The article of claim 2, wherein the flow-through substrate is honeycomb shaped.

5. The article of claim 2, wherein the $CO_2$ sorbent comprises a polyethyleneimine.

6. The article of claim 1, wherein the porous walls of the flow-through substrate have a surface area greater than 200 m2/g.

7. The article of claim 6, wherein the flow-through substrate is honeycomb shaped.

8. The article of claim 1, wherein the flow-through substrate is honeycomb shaped.

9. The article of claim 1, wherein the flow-through substrate is honeycomb shaped.

10. The article of claim 1, wherein the $CO_2$ sorbent comprises a polyethyleneimine.

11. A method of making the article of claim 1, the method comprising:
   preparing a solution of $CO_2$ sorbent dispersed in a solvent;
   contacting a flow-through substrate comprising channels defined by porous walls with the solution.

12. A method of removing $CO_2$ from a gas, the method comprising:
   providing an article according to claim 1;
   contacting the article with a gas comprising $CO_2$, wherein the contacting occurs at a temperature of up to 40° C.

13. The method of claim 12, further comprising a step of desorbing $CO_2$ from the article, comprising heating the article to a temperature above the desorption temperature of the $CO_2$.

* * * * *